A. H. DONNALLY.
SPRING WHEEL.
APPLICATION FILED JUNE 25, 1917.
1,260,880.
Patented Mar. 26, 1918.
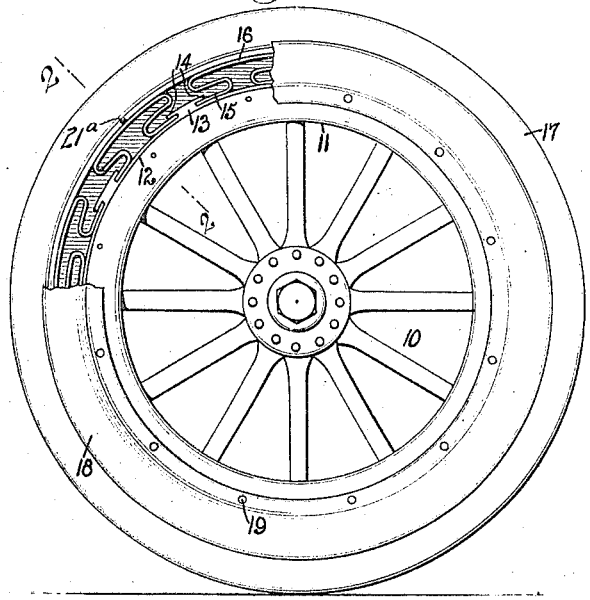
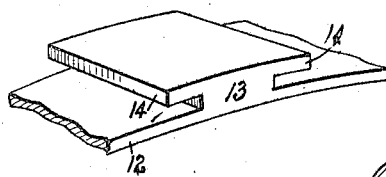
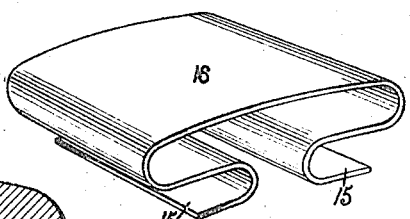
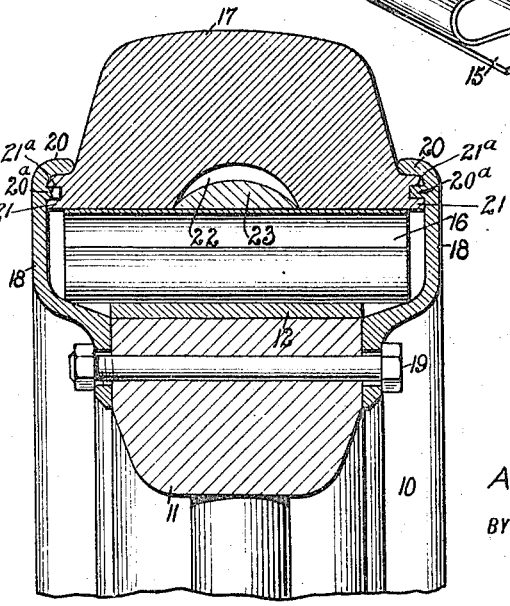
WITNESSES
INVENTOR
A. H. Donnally
BY
ATTORNEYS

UNITED STATES PATENT OFFICE.

ALFRED H. DONNALLY, OF FAIRMONT, WEST VIRGINIA.

SPRING-WHEEL.

1,260,880. Specification of Letters Patent. Patented Mar. 26, 1918.

Application filed June 25, 1917. Serial No. 176,724.

*To all whom it may concern:*

Be it known that I, ALFRED H. DONNALLY, a citizen of the United States, and a resident of Fairmont, in the county of Marion and State of West Virginia, have invented a new and Improved Spring-Wheel, of which the following is a full, clear, and exact description.

The invention relates particularly to a spring wheel having a novel arrangement of springs beneath a solid, resilient tire, novel means for securing the springs in position, and novel means for preventing displacement of the tire.

The invention will be particularly described in the specific description following.

Reference is to be had to the drawings forming a part of this specification, in which similar characters of reference indicate corresponding parts in all the views, and in which—

Figure 1 is a side elevation, with parts broken away, of a wheel embodying my invention;

Fig. 2 is a transverse section on a larger scale on the line 2—2 of Fig. 1;

Fig. 3 is a perspective view of a portion of the metallic rim on the felly of the wheel; and Fig. 4 is a perspective view of one of the springs.

In constructing a practical embodiment of my invention, any approved wheel 10 has applied to the felly 11 thereof, a metallic rim 12. On the rim 12, I produce or fixedly secure blocks or raised projections 13, there being an annular series of these on the exterior of the rim 12. Each block 13 has its side edges under-cut to produce over-hanging flanges 14, beneath which are received the ends 15 of springs 16. The springs are formed of plate metal in arched form at the outer side to conform to the inner periphery of a solid resilient tire 17 and the ends of the springs are returned twice, giving each end an S-curve, terminating in the outwardly disposed ends 15 at the inner or rim side of a spring to fit beneath the flanges 14. It will be observed that the springs are unsecured except by the flanges 14, and that the relative size and positions of the said springs and flanges are such that the springs are required to be sprung into place to fit between opposed lugs 13.

The springs are inclosed at the sides by annular plates 18, which are secured to the felly 11 of the wheel by bolts 19 or their equivalent. The outer edge of each side plate 18 is inturned laterally as at 20, to present flanges that overlap the side flanges 21 on the tire 17. The cushion tire 17 has an annular groove 22 at the inner side thereof in which an expansion ring 23 is received, said ring being of flexible material harder than the tire 17, as for example, indurated fiber. The expansion ring 23 is convexed at its outer surface and the groove 22 of the tire is correspondingly concave so that the sides of the tire will be expanded by the said ring to have secure engagement with the side plates 18. Also, the expansion ring serves to stiffen and strengthen the tire and to distribute evenly the pressure exerted by the springs 16. To prevent creeping of the tire 17 its flanges 21 have recesses 21ª that receive lugs 20ª on the side plates 18.

By the described construction an efficient spring wheel is produced involving few and simple parts adapted to be assembled and disassembled with facility.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a wheel, a rim having an annular series of lugs, each lug presenting overhanging flanges at the ends thereof, an annular series of plate springs having S-shaped ends presenting at the inner sides thereof outwardly projecting terminals which are received beneath the flanges of the lugs and a resilient tire outside of the said springs, the said springs being of a size to maintain the said terminals thereof permanently beneath said flanges and the springs being held in position between the lugs by the resiliency of said springs.

2. In a spring wheel, a rim, an annular series of lugs on said rim at the periphery and presenting oppositely disposed flanges at their ends, a series of springs S-shaped at each end, and a tire outside of said springs, the said springs presenting outwardly disposed terminals, seated on said rim, and the springs being sprung into position between the lugs with the terminals of the springs beneath the said flanges, said lugs and flanges constituting a securing means for the springs.

ALFRED H. DONNALLY.

Copies of this patent may be obtained for five cents each, by addressing the "Commissioner of Patents, Washington, D. C."